MUS008467785B2

(12) United States Patent
Montemurro et al.

(10) Patent No.: US 8,467,785 B2
(45) Date of Patent: Jun. 18, 2013

(54) WLAN SCANNING BY PREVALENCE OF ACCESS POINT DEPLOYMENT ON CERTAIN CHANNELS

(75) Inventors: Michael Montemurro, Toronto (CA); Roger Durand, Amherst, NH (US); Sherif Abdel-Kader, Waterloo (CA)

(73) Assignee: Research In Motion Limited, Waterloo (CA)

( * ) Notice: Subject to any disclaimer, the term of this patent is extended or adjusted under 35 U.S.C. 154(b) by 821 days.

(21) Appl. No.: 11/877,906

(22) Filed: Oct. 24, 2007

(65) Prior Publication Data
US 2009/0111466 A1 Apr. 30, 2009
US 2010/0267380 A2 Oct. 21, 2010

Related U.S. Application Data

(60) Provisional application No. 60/862,630, filed on Oct. 24, 2006.

(51) Int. Cl.
H04W 4/00 (2009.01)
(52) U.S. Cl.
USPC .......................... 455/434; 455/432.1; 455/436
(58) Field of Classification Search
USPC ................. 370/241, 328, 329, 331, 332, 338, 370/341, 355, 461, 469; 455/32.1, 161.1, 455/166.1, 410, 422.1, 432.1, 434, 436, 450, 455/466, 515, 550.1, 512, 513
See application file for complete search history.

(56) References Cited

U.S. PATENT DOCUMENTS

| 6,185,423 | B1 | 2/2001 | Brown et al. |
| 2003/0158922 | A1 | 8/2003 | Park |
| 2004/0033804 | A1 | 2/2004 | Binzel |
| 2004/0090929 | A1* | 5/2004 | Laux et al. ................ 370/311 |
| 2004/0102192 | A1 | 5/2004 | Serceki |
| 2004/0120278 | A1 | 6/2004 | Krantz et al. |

(Continued)

FOREIGN PATENT DOCUMENTS

| CN | 1675942 A | 9/2005 |
| CN | 1711719 A | 12/2005 |

(Continued)

OTHER PUBLICATIONS

Extended European Search Report for copending European Application No. 07816045.4-1525.

(Continued)

*Primary Examiner* — Wesley Kim
*Assistant Examiner* — Dinh P Nguyen
(74) *Attorney, Agent, or Firm* — Novak Druce Connolly Bove + Quigg LLP

(57) ABSTRACT

A wireless local area network client device scans for wireless local area networks using a scanning scheme that takes into account the relative prevalence, in a population of access points, of access point deployment on the channels to be scanned. In one aspect, channels on which more access points in the population are deployed are scanned prior to channels on which fewer access points in the population are deployed. In another aspect, channels on which more access points in the population are deployed are scanned more often than channels on which fewer access points in the population are deployed. In yet another aspect, channels on which more access points in the population are deployed are scanned prior to and more often than channels on which fewer access points in the population are deployed.

16 Claims, 6 Drawing Sheets

U.S. PATENT DOCUMENTS

| | | | |
|---|---|---|---|
| 2004/0192328 A1 | 9/2004 | Giacalone et al. | |
| 2004/0205158 A1 | 10/2004 | Hsu | |
| 2004/0266430 A1* | 12/2004 | Fudim et al. | 455/434 |
| 2005/0063334 A1 | 3/2005 | Fnu et al. | |
| 2005/0070279 A1 | 3/2005 | Ginzburg et al. | |
| 2005/0147070 A1 | 7/2005 | Cromer et al. | |
| 2006/0009216 A1 | 1/2006 | Welnick et al. | |
| 2006/0121929 A1* | 6/2006 | Cave et al. | 455/522 |
| 2006/0142004 A1 | 6/2006 | He et al. | |
| 2008/0014934 A1* | 1/2008 | Balasubramanian et al. | 455/434 |
| 2008/0075035 A1* | 3/2008 | Eichenberger | 370/328 |
| 2008/0175209 A1 | 7/2008 | Abdel-Kader et al. | |
| 2008/0176581 A1 | 7/2008 | Abdel-Kader | |
| 2008/0198820 A1 | 8/2008 | Abdel-Kader | |

FOREIGN PATENT DOCUMENTS

| | | |
|---|---|---|
| EP | 1492276 A2 | 12/2004 |
| WO | 2004045225 | 5/2004 |
| WO | 2005032059 | 4/2005 |

OTHER PUBLICATIONS

Written Opinion for corresponding PCT/CA2007/001895 dated Feb. 6, 2008.

Hye-Soo, Kim et al., "Selective Channel Scanning for Fast Handoff in Wireless LAN using Neighbor Graph", (Jul. 6, 2004).

Abdel-Kader et al., "Determining a WLAN Regulatory Domain", U.S. Appl. No. 11/736,944.

Communication Pursuant to Article 94(3) EPC, mailed Feb. 4, 2011, from the European Patent Office in Application No. 07 816 045.4-1525.

Office Action dated Jun. 24, 2011. In corresponding Chinese application No. 200780043481.2.

Republic of China English translated Second Office Action mailed Jan. 31, 2012. In corresponding application No. 200780043481.2.

English translation of Rejection Decision for PCT Application Entering the National Phase issued Aug. 31, 2012 in corresponding application No. 200780043481.2.

* cited by examiner

WLAN SCANNING BY PREVALENCE OF ACCESS POINT DEPLOYMENT ON CERTAIN CHANNELS

CROSS-REFERENCE TO RELATED APPLICATIONS

This application claims priority under 35 USC 119(e) from U.S. Provisional Patent Application No. 60/862,630, filed Oct. 24, 2006, and which is incorporated by reference herein.

BACKGROUND

A wireless local area network (WLAN) client device may store in its memory one or more profiles of wireless local area networks. A profile may include, for example, the service set identity (SSID) of the network, WLAN configuration parameters, security credentials, and Internet Protocol (IP) network parameters. The SSID is also known as the network name. The profiles may be assigned priorities, for example, by a user that has purchased the client device, a carrier who controls the sale of the client device, or an administrator of an enterprise that has purchased the client device.

Scanning is the process of identifying existing networks. Upon being operatively coupled to a radio of the client device, a WLAN controller of the client device may automatically initiate passive scanning. In passive scanning, the WLAN controller generally listens for beacon frames broadcast by access points (APs), one communication channel at a time. The communication channels, and the time spent passively scanning on a communication channel, are defined by the WLAN standard and/or regulatory requirements. Beacon frames of a WLAN are broadcast at regular intervals, for example, roughly each 100 ms. The SSIDs of the profiles stored in the client device are compared to the SSIDs included in beacon frames received by the client device on a particular communication channel. The order in which SSIDs of the profiles are compared to the SSIDs of the scan results may be determined by one or more factors. For example, the SSIDs of the profiles may be compared in order of decreasing priority for the profiles. In another example, the SSIDs of the scan results may be compared in order of decreasing received signal strength. If the SSID field of a received beacon frame matches the SSID of a particular profile, the WLAN controller may initiate an authentication process and, if the authentication process is successful, may initiate an association or re-association process with the AP that sent the beacon frame. If the comparison does not result in any matches, then the client device may present a list of identified networks (based on the SSID fields of any received beacon frames) to the user of the client device, so that the user can select which, if any, of the networks to join.

In active scanning, the WLAN controller transmits an active probe request including an SSID on a communication channel on which the regulatory requirements allow active probing. The WLAN controller may receive one or more probe responses. The probe responses may be received within 15 ms of the transmission of the active probe request. The active probe request may include a particular SSID, in which case probe responses will be received from APs in the vicinity that are hosting a WLAN having the particular SSID. Alternatively, the active probe request may include a "wild card" for an SSID and probe responses may be received from more than one network. In the latter case, the SSIDs of the profiles stored in the client device are compared to the SSIDs included in the probe responses. The order in which SSIDs of the profiles are compared to the SSIDs of the probe responses may be determined by one or more factors. For example, the SSIDs of the profiles may be compared in order of decreasing priority for the profiles. In another example, the SSIDs of the probe responses may be compared in order of decreasing received signal strength. If the SSID included in a probe response matches the SSID of a particular profile, the WLAN controller may initiate an authentication process and, if the authentication process is successful, may initiate an association or re-association process with the AP that sent the probe response. If no probe responses are received, the client device may transmit the active probe request on a different communication channel, or may transmit an active probe request including a different SSID, or may put its radio into a low-power state.

A WLAN may have a suppressed SSID, in which case beacon frames for that WLAN will not include the suppressed SSID. Likewise, an AP having a suppressed SSID may ignore probe requests including a "wild card" SSID, or may respond with a probe response which lacks the SSID. If the client device stores one or more profiles having suppressed SSIDs, the client device may actively scan for those profiles using an active probe request including the suppressed SSID. An AP having a suppressed SSID will respond to such an active probe request with a probe response which includes the suppressed SSID, if the SSID of the network handled by the AP matches that in the active probe request.

For battery-operated client devices, the process of network discovery and association in a timely manner consumes significant battery life.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
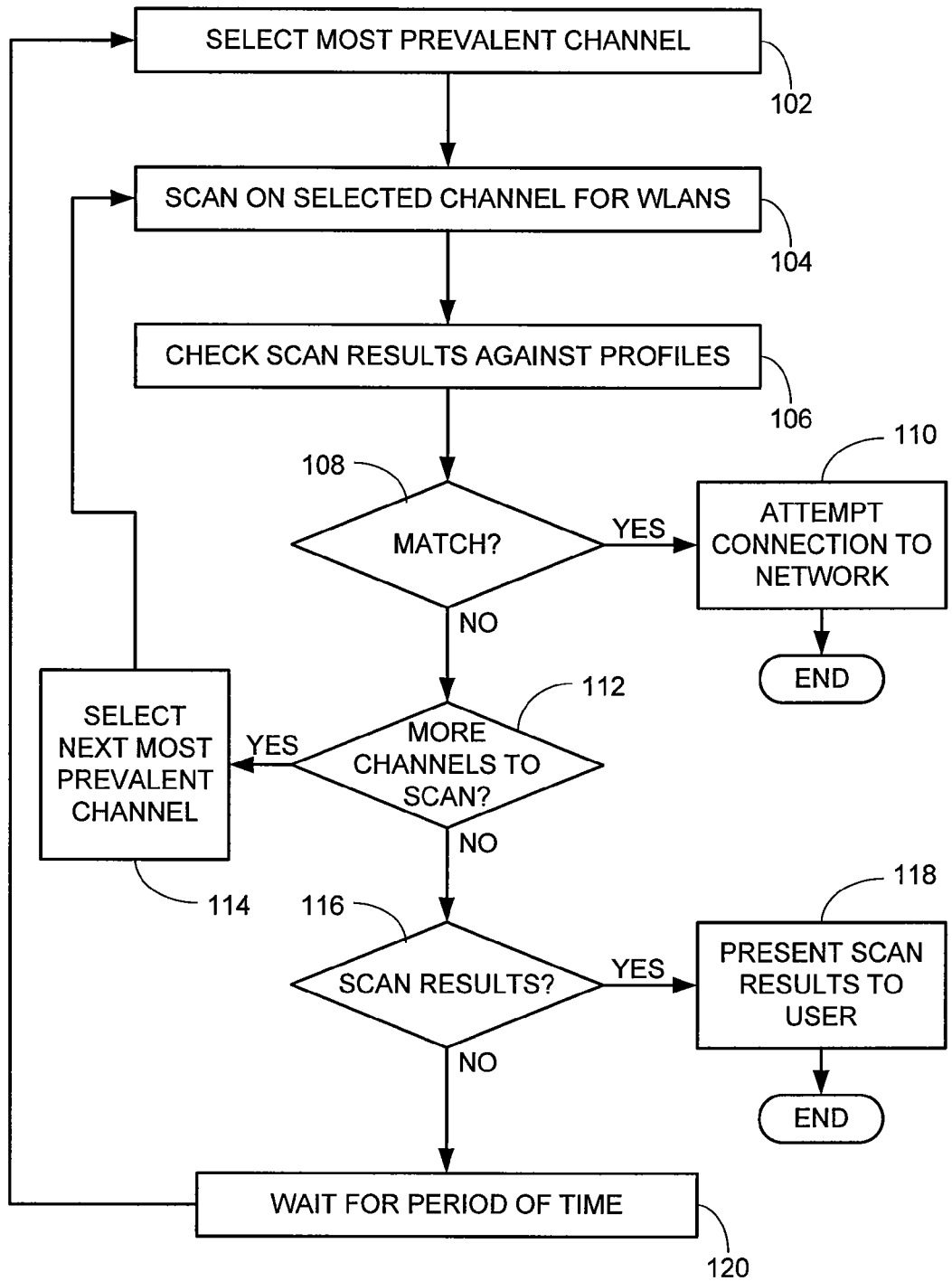
FIGS. 1-5 are flowcharts of exemplary scanning schemes.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A mobile WLAN client device periodically scans for wireless networks automatically so that it can maintain network connectivity. Whether connected or disconnected to a WLAN, the client device scans for neighboring APs so that it can initiate or maintain a connection to a data network. The more channels that are scanned, the longer the scanning process takes. This process may reduce the battery life of the client device. There is a tradeoff between scanning for WLANs and battery life.

Typically, a client device will scan for WLANs using a scanning scheme in which channels are scanned in increasing numerical order. If no results are found, the client device may wait for a period of time, and then resume scanning the channels in increasing numerical order. The period of time that the client device waits may increase in duration between scan sessions in which no results are found, subject to an upper limit. The client device may enter a lower power state during all or part of the period of time between scan sessions. The channels to be scanned may be all possible channels for a particular frequency band such as the 2.4 GHz band or the 5 GHz band, or may be limited to those channels of the frequency band which are valid in a particular regulatory domain, or may be any other subset of channels. For example, a client device scanning according to this scanning scheme for all possible channels in the 2.4 GHz band will scan first on channel 1, then on channel 2, then on channel 3, and so on. In another example, a client device scanning according to this scanning scheme for channels of the 2.4 GHz band that are permitted in Israel will scan first on channel 3, then on channel 4, then on channel 5, and so on.

However, the likelihood of detecting a WLAN is not the same on all channels. Many WLANs are deployed with only a single AP, and the channel which the AP uses to handle the WLAN is often unchanged from the default factory setting. Even if a WLAN is deployed using more than one AP, the channel settings of the APs may be selected so that neighboring APs use non-overlapping channels. When an AP is configured to operate on a certain channel to handle the WLAN, the AP is said to be "deployed" on that channel.

The inventors have realized that having the client device scan for WLANs using a scanning scheme that takes into account the relative prevalence, in a population of access points, of access point deployment on channels, may result in faster detection of networks or in less power consumption or in both than using the scanning scheme in which channels are scanned in increasing numerical order.

The population of access points which the scanning scheme takes into account may be the general population worldwide. For example, current statistics for the 2.4 GHz band indicate that the prevalence in APs worldwide of access point deployment on channels yields the following order, from channels on which the most APs are deployed to channels on which fewest APs are deployed: 6, 1, 11, 9, 13, 5, 2, 3, 4, 7, 8, 10, 12 and 14.

Alternatively, the population of access points which the scanning scheme takes into account may be the general population in a single regulatory domain, the general population in a particular market or the general population in a single country. For example, current statistics for the 2.4 GHz band indicate that the most prevalent deployment in North America is on channel 6, the second most prevalent deployment in North America is on channel 1, and the third most prevalent deployment in North America is on channel 11. This is not surprising, since the only set of non-overlapping channels in the 2.4 GHz band in use in North America is the set of channels 1, 6 and 11. In another example, current statistics for the 2.4 GHz band indicate that the six most prevalent deployments in Europe are on channels 5, 1, 9, 13, 6, and 11. In yet another example, current statistics for the 2.4 GHz band indicate that the least prevalent deployment in Japan is on channel 14, due to special rules for use of this channel.

A client device that is intended to be operable in more than one regulatory domain, or in more than one market, or in more than one country, may therefore be configured to use different scanning schemes in different regulatory domains, markets or countries. If the client device has determined the regulatory domain or market or country in which it is currently located, it will use a scanning scheme that is specific to that regulatory domain or market or country. When not in a regulatory domain or market or country for which it has a specific scanning scheme, such a client device may revert to a scanning scheme that takes into account the general worldwide population of access points. There are many different ways for the client device to determine the regulatory domain or market or country in which it is currently located, and discussion of these different ways is beyond the scope of this document. However, some WLAN controllers lose their regulatory domain-dependent configurations when out of coverage. To compensate for this, the client device may store in its memory an indication of the regulatory domain in which it was last located, so as to modify or bias the worldwide scan to favor that regulatory domain. This is with an understanding that the probability of the client device being in the same regulatory domain is greater than the probability of the client device having moved far enough in either space or time so as not to be in the same regulatory domain. Until the client device is able to determine that it is in a different regulatory domain, the client device may use a modified world scanning scheme that is biased to favor the regulatory domain specified by the stored indication, that is, the regulatory domain in which it was last located.

As a further alternative, the population of access points which the scanning scheme takes into account may be a population of access points that the client device has previously detected. The client device may maintain statistics of channels on which it has detected wireless local area networks and determine the relative prevalence of channels from the statistics it maintains. For example, the statistics for a particular client device may indicate that the most prevalent deployment is on channel 5, the second most prevalent deployment is on channel 6, and the third most prevalent deployment is on channel 1.

As yet another alternative, the population of access points which the scanning scheme takes into account may be any combination of one or more of the populations described hereinabove. Other populations of access points are also contemplated.

How a scanning scheme takes into account the relative prevalence, in a population of access points, of access point deployment on channels, will now be described. In one aspect, the scanning scheme may involve scanning for one or more channels on which more access points in the population are deployed prior to scanning for one or more channels on which fewer access points in the population are deployed. In another aspect, the scanning scheme may involve scanning for one or more channels on which more access points in the population are deployed more often than scanning for one or more channels on which fewer access points in the population are deployed. Some scanning schemes may involve scanning for one or more channels on which more access points in the population are deployed prior to and more often than scanning for one or more channels on which fewer access points in the population are deployed.

FIG. 1 is a flowchart of an exemplary scanning scheme able to be implemented in a WLAN client device. In this exemplary scanning scheme, the WLAN client device scans for wireless local area networks according to a channel order in which channels are ordered by the decreasing relative prevalence, in a population of access points, of access point deployment on those channels. This is a specific case of scanning for one or more channels on which more access points in the population are deployed prior to scanning for one or more channels on which fewer access points in the population are deployed. An example of a channel order for scanning with this scanning scheme in the 2.4 GHz band when the population is the general worldwide population or the Japanese market is the order 6, 1, 11, 9, 13, 5, 2, 3, 4, 7, 8, 10, 12, 14. An example of a channel order for scanning with this scanning scheme in the 2.4 GHz band when the population is the North American market is the order 6, 1, 11, 3, 5, 8, 2, 7, 9, 4, 10. An example of a channel order for scanning with this scanning scheme in the 2.4 GHz band when the population is the European market is the order 5, 1, 9, 13, 6, 11, 3, 8, 2, 7, 4, 10, 12. In the event that the population is a general population worldwide, or a general population in a single regulatory domain, or a general population in a single market, or a general population in a single country, or any combination thereof, the channel order used by the scanning scheme may be hard-coded or programmable in the client device. In the event that client device determines the relative prevalence of channels from statistics it maintains of channels on which it has detected wireless local area networks, the client device will determine channel order dynamically.

At 102, the client device selects, from the set of channels to be scanned, the channel on which most of the access points in the population are deployed. For conciseness of description, this channel is referred to as the "most prevalent channel". At 104, the WLAN controller of the client device scans on the selected channel for wireless local area networks. The scanning may be passive or active or involve a combination of the two types. Any suitable scanning algorithm may be used at 104.

At 106, the client device checks the scan results against profiles, if any, that are stored by the client device. The profiles may be checked against the scan results in any suitable order. If there is a match, as checked at 108, then the client device attempts at 110 to connect to the wireless local area network that matches the profile. The attempt may involve initiating an authentication process and, if the authentication process is successful, initiating an association or re-association process with the AP the WLAN of which is identified in the matching scan results. The details of this are beyond the scope of this document.

If there is no match but there are additional channels to scan (checked at 112), the client device selects the next most prevalent channel of the set at 114 and the method proceeds to 104 to scan on the selected channel. The term "next most prevalent channel" is to be understood as the channel on which the next highest number of access points in the population are deployed.

If all suitable channels have been scanned without resulting in a matched profile, and there were indeed scan results (checked at 116), the client device may present the scan results to the user at 118. If there were no scan results (which will occur, for example, when the client device is out of coverage), then the client device may wait for a period of time at 120, and when this period of time has elapsed, the method may resume from 102. The period of time during which the client device waits may be fixed, or may vary from one scan session to another. For example, successive scan sessions may be separated by increasing periods of time, possibly subject to an upper limit. The client device may enter a lower power state during all or part of the period of time between scan sessions.

By scanning the communication channels in order according to their decreasing relative prevalence, networks, if present, may be detected faster and/or with less power consumption than with a standard scanning scheme in which channels are scanned in increasing numerical order. If all suitable channels are scanned and there are no scan results, the scanning scheme of FIG. 1 may take the same amount of time as the scanning scheme in which channels are scanned in increasing numerical order.

Groups of Channels

Figure 3:
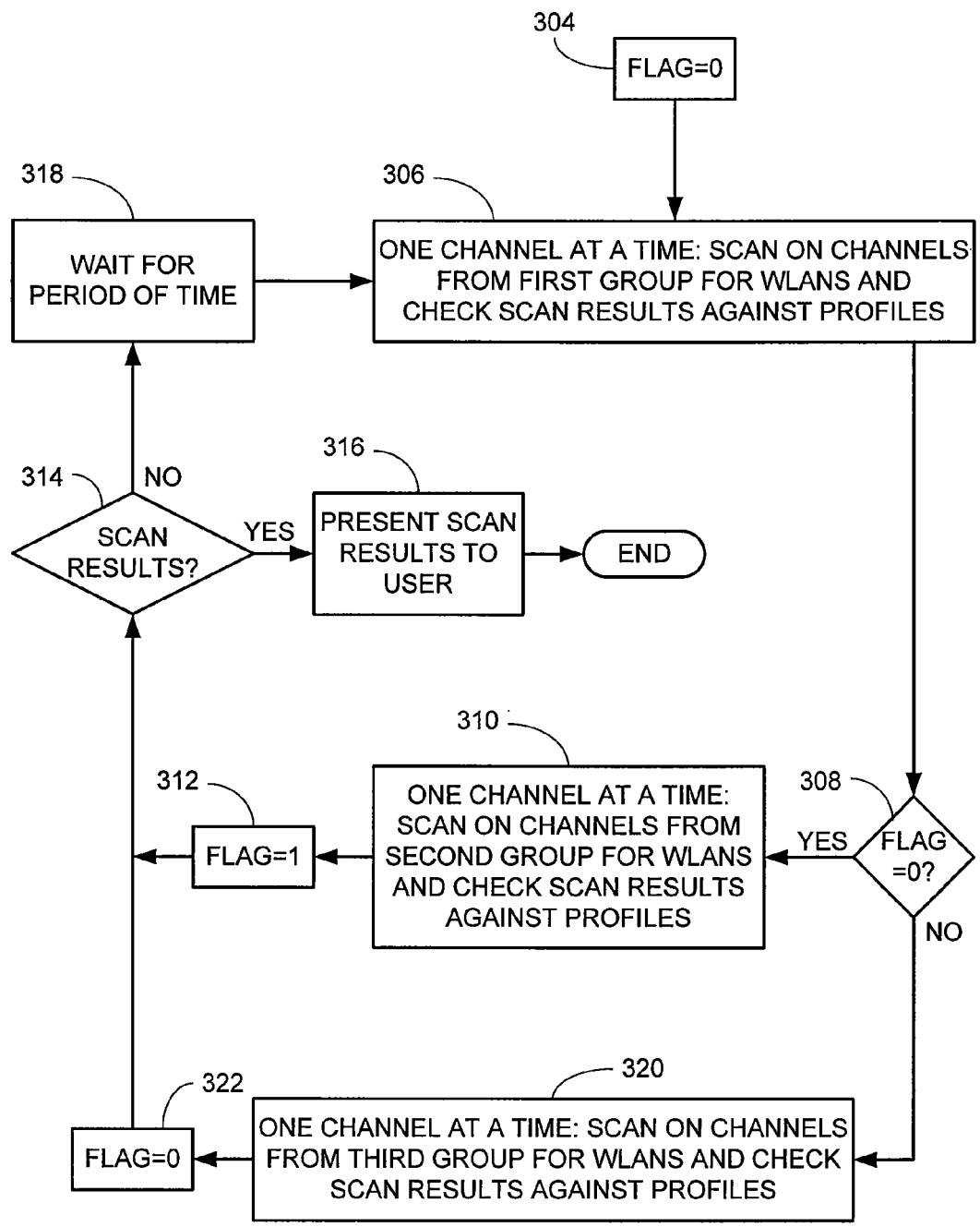
Figure 4:
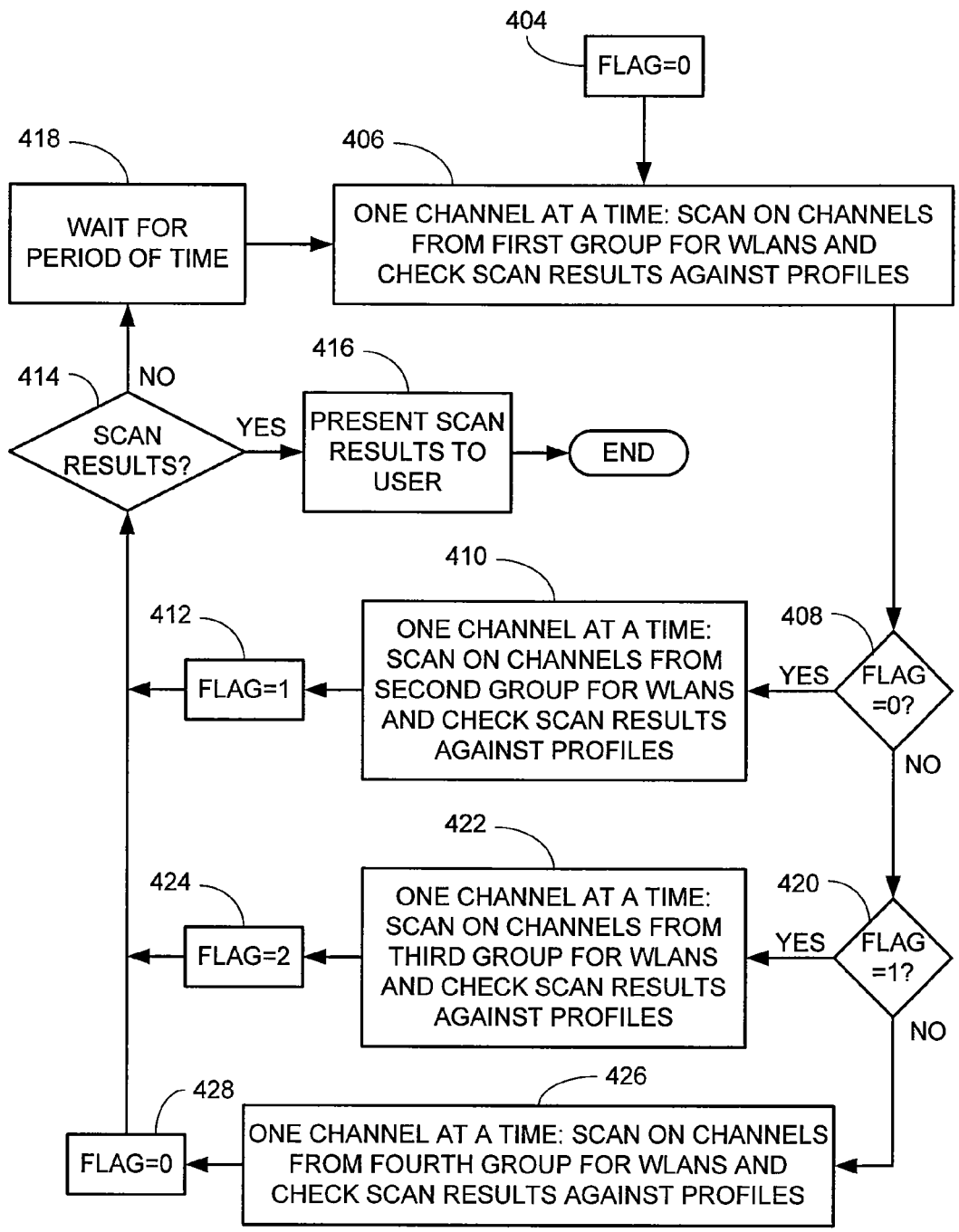

In some exemplary scanning schemes, one or more channels on which more access points in the population are deployed are grouped together, and the remaining channels (on which fewer access points in the population are deployed) are treated differently than the channel(s) that are grouped together. The exemplary scanning scheme described below with respect to FIG. 2 involves a group of one or more channels on which more access points in the population are deployed. The exemplary scanning schemes described below with respect to FIGS. 3, 4 and 5 involve a first group of one or more channels on which more access points in the population are deployed and N other groups formed from the remaining channels, on which fewer access points in the population are deployed, where N is a whole number greater than or equal to two. In the case of FIG. 3, N is two. In the case of FIG. 4, N is three. The partition of the remaining channels into N groups may be done arbitrarily or based on the probability of finding deployed access points on specific channels.

For example, if the channels to be scanned are in the 2.4 GHz band and the population is based on access points in North America, the group of channels on which more access points in the population are deployed may consist of channels 6, 1, and 11. If N is two, the second group may consist of channels 2, 4, 7 and 9, and the third group may consist of channels 3, 5, 8 and 10. If N is three, the second group may consist of channels 3, 5 and 8, the third group may consist of channels 2, 7 and 9, and the fourth group may consist of channels 4 and 10.

In another example, if the channels to be scanned are in the 2.4 GHz band and the population is based on access points in Europe, the group of channels on which more access points in the population are deployed may consist of channels 5, 1, 9, 13, 6 and 11.

In yet another example, if the channels to be scanned in the 5 GHz band are in the multiple sub-bands used by access points in North America, the group of channels on which more access points in the population are deployed may consist of channels 36, 48, 149, 161, 52, 64, 40, 44, 153, 157, 56, 60 and 165 or a subset thereof. If N is two, the group of more prevalent channels may consist of channels 36, 48, 149, 161, 52 and 64, the second group may consist of channels 40, 44, 153 and 157, and the third group may consist of channels 56, 60 and 165.

In a further example, if the channels to be scanned in the 5 GHz band are across multiple sub-bands used by access points in Europe, the group of channels on which more access points in the population are deployed may consist of channels 36, 48, 52, 64, 40, 44, 56, 60, 100, 140, 104, 136, 108, 132, 112, 116, 120, 124 and 128 or a subset thereof.

In yet another example, if the channels to be scanned in the 5 GHz band are across multiple sub-bands used by access points in Asia, the group of channels on which more access points in the population are deployed may consist of channels 36, 34, 48, 46, 40, 38, 44, 42, 52 and 64.

In the event that the population is a general population worldwide, or a general population in a single regulatory domain, or a general population in a single market, or a general population in a single country, or any combination thereof, the groups may be hard-coded or programmable in the client device. In the event that the client device determines the relative prevalence of access point deployment on channels from statistics it maintains of channels on which it has detected wireless local area networks, the client device may modify or determine the groups dynamically.

Figure 2:
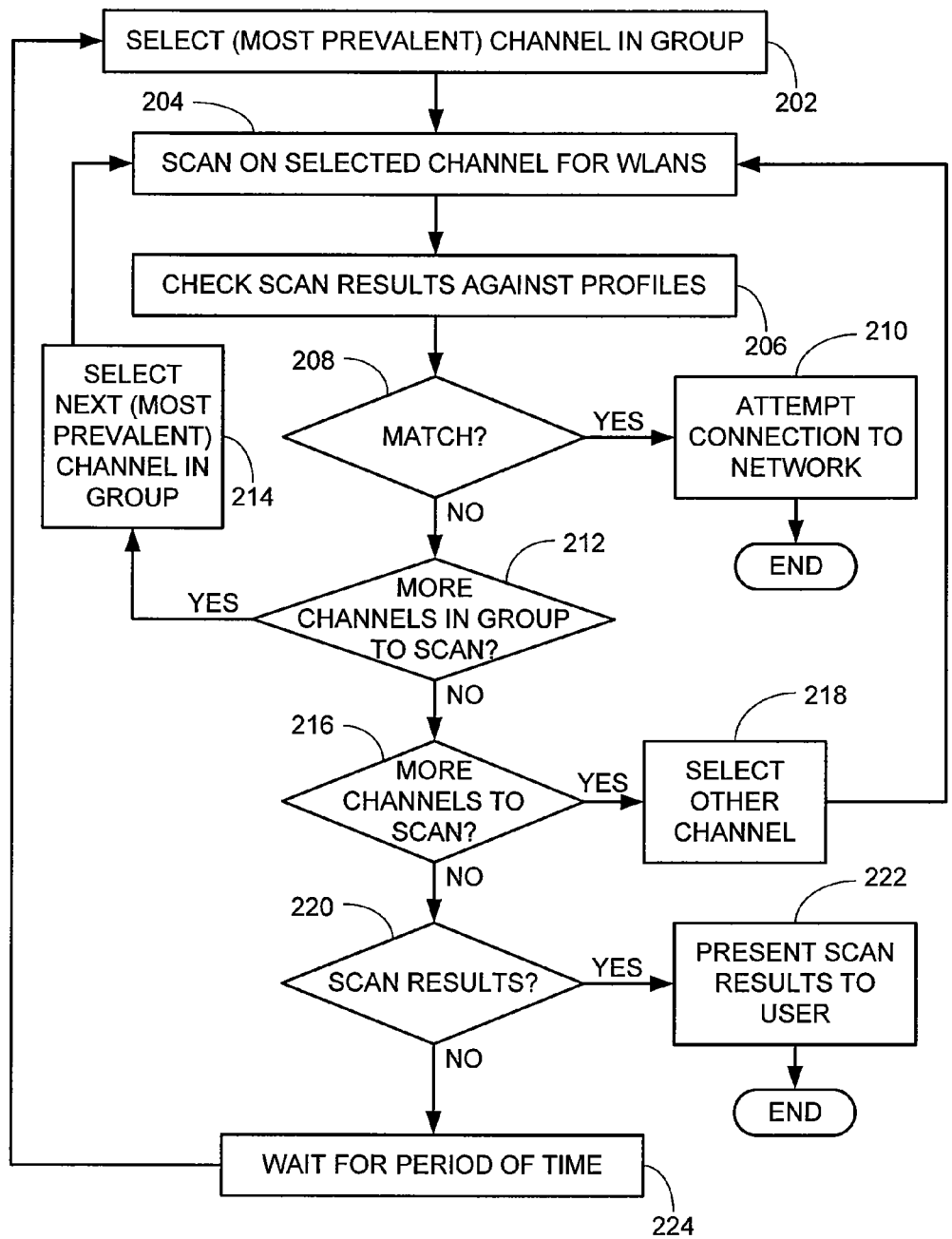

FIG. 2 is a flowchart of another exemplary scanning scheme able to be implemented in a WLAN client device. In this exemplary scanning scheme, the WLAN client device scans the one or more channels on which more access points in the population are deployed prior to scanning the remaining channels (on which fewer access points in the population are deployed) in the complete set of channels to be scanned.

At 202, the client device selects a channel from the group of one or more channels on which more access points in the population are deployed. The channel that is selected initially at 202 may be the most prevalent channel in the group. Alternatively, all channels belonging to the group may be treated similarly, in which case, any channel belonging to the group may be selected at 202 as long as it has not been previously selected during the particular scan session.

At 204, the WLAN controller of the client device scans on the selected channel for wireless local area networks. The scanning may be passive or active or involve a combination of the two types. Any suitable scanning algorithm may be used at 204.

At 206, the client device checks the scan results against profiles, if any, that are stored by the client device. The profiles may be checked against the scan results in any suitable order. If there is a match, as checked at 208, then the client device attempts at 210 to connect to the wireless local area network that matches the profile. The attempt may involve initiating an authentication process and, if the authentication process is successful, initiating an association or re-association process with the AP the WLAN of which is identified in the matching scan results.

If there is no match but there are additional channels to scan in the group of channels on which more access points in the population are deployed (checked at 212), the client device selects the next channel of the group at 214 and the method proceeds to 204 to scan on the selected channel. The channel that is selected at 214 may be the next most prevalent channel in the group. Alternatively, all channels belonging to the group may be treated similarly, in which case, any channel belonging to the group may be selected at 214 as long as it has not been previously selected during the particular scan session.

If all channels in the group have been scanned without resulting in a matched profile, and there are more channels in the complete set to be scanned (checked at 216), the client device selects one of the other channels at 218 and the method proceeds to 204 to scan on the selected channel. The order in which the other channels are selected may be according to the decreasing relative prevalence, in the population, of access point deployment on those other channels, but this is not necessary.

If all suitable channels have been scanned and there were indeed scan results (checked at 220), the client device may present the scan results to the user at 222. If there were no scan results (which will occur, for example, when the client device is out of coverage), then the client device may wait for a period of time at 224, and when this period of time has elapsed, the method may resume from 202. The period of time during which the client device waits may be fixed, or may vary from one scan session to another. For example, successive scan sessions may be separated by increasing periods of time, possibly subject to an upper limit. The client device may enter a lower power state during all or part of the period of time between scan sessions.

By scanning the communication channels on which more access points in the population are deployed prior to scanning the communication channels on which fewer access points in the population are deployed, networks, if present, may be detected faster and/or with less power consumption than with a standard scanning scheme in which channels are scanned in increasing numerical order. If all suitable channels are scanned and there are no scan results, the scanning scheme of FIG. 2 may take the same amount of time as the scanning scheme in which channels are scanned in increasing numerical order.

FIG. 3 is a flowchart of an exemplary scanning scheme able to be implemented in a WLAN client device. In this exemplary scanning scheme, the WLAN client device scans each scan session one or more channels on which more access points in the population are deployed, while the WLAN client device scans every other scan session channels on which fewer access points in the population are deployed. If there are no scan results, this exemplary scanning scheme may take less time than the scanning scheme in which channels are scanned in increasing numerical order, but not all suitable channels will be scanned in each scan session. If a wireless local area network to be detected is on a channel on which fewer access points in the population are deployed, more time may be required to detect the network with this exemplary scanning scheme than with the scanning scheme in which channels are scanned in increasing numerical order. However, if there are no scan results, this exemplary scanning scheme may result in lower power consumption for the client device than with the scanning scheme in which channels are scanned in increasing numerical order, since less time is spent scanning.

At 304, a flag is set to zero. At 306, one channel at a time, the WLAN controller of the client device scans for wireless local area networks on the channels from the first group and checks the scan results against profiles, if any, that are stored in the client device. The scanning may be passive or active or involve a combination of the two types. The order in which the channels in the first group are scanned may be according to the decreasing relative prevalence, in the population, of access point deployment on the channels in the first group, or may be any other order. Any suitable scanning algorithm may be used at 306. The profiles may be checked against the scan results in any suitable order. If there is a match, then the scanning scheme will end, and the client device will attempt to connect to the wireless local area network that matches the profile.

If all of the channels in the first group have been scanned without a profile match, the method proceeds to 308, where the client device checks the value of the flag. If the flag is zero, then at 310, one channel at a time, the WLAN controller of the client device scans for wireless local area networks on the channels from the second group and checks the scan results against profiles, if any, that are stored in the client device. The scanning may be passive or active or involve a combination of the two types. The order in which the channels in the second group are scanned may be according to the decreasing relative prevalence, in the population, of access point deployment on the channels in the second group, or may be any other order. Any suitable scanning algorithm may be used at 310. The profiles may be checked against the scan results in any suitable order. If there is a match, then the scanning scheme will end, and the client device will attempt to connect to the wireless local area network that matches the profile. If all of the channels in the second group have been scanned without a profile match, the flag is set to one at 312, and the method proceeds to 314.

If there were indeed scan results (checked at 314), the client device may present the scan results to the user at 316. If there were no scan results (which will occur, for example, when the client device is out of coverage), then the client device may wait for a period of time at 318, and when this period of time has elapsed, the method may resume from 306.

The period of time during which the client device waits may be fixed, or may vary from one scan session to another. For example, successive scan sessions may be separated by increasing periods of time, possibly subject to an upper limit. The client device may enter a lower power state during all or part of the period of time between scan sessions.

If at 308 the flag is one, then the method proceeds to 320. At 320, one channel at a time, the WLAN controller of the client device scans for wireless local area networks on the channels from the third group and checks the scan results against profiles, if any, that are stored in the client device. The scanning may be passive or active or involve a combination of the two types. The order in which the channels in the third group are scanned may be according to the decreasing relative prevalence, in the population, of access point deployment on the channels in the third group, or may be any other order. Any suitable scanning algorithm may be used at 320. The profiles may be checked against the scan results in any suitable order. If there is a match, then the scanning scheme will end, and the client device will attempt to connect to the wireless local area network that matches the profile. If all of the channels in the third group have been scanned without a profile match, the flag is set to zero at 322, and the method proceeds to 314, where it is checked whether there are indeed scan results.

FIG. 4 is a flowchart of an exemplary scanning scheme able to be implemented in a WLAN client device. In this exemplary scanning scheme, the WLAN client device scans each scan session one or more channels on which more access points in the population are deployed, while the WLAN client device scans every third scan session channels on which fewer access points in the population are deployed. If there are no scan results, this exemplary scanning scheme may take less time than the scanning scheme in which channels are scanned in increasing numerical order, but not all suitable channels will be scanned in each scan session. If a wireless local area network to be detected is on a channel on which fewer access points in the population are deployed, more time may be required to detect the network with this exemplary scanning scheme than with the scanning scheme in which channels are scanned in increasing numerical order. However, if there are no scan results, this exemplary scanning scheme may result in lower power consumption for the client device than with the scanning scheme in which channels are scanned in increasing numerical order, since less time is spent scanning.

At 404, a flag is set to zero. At 406, one channel at a time, the WLAN controller of the client device scans for wireless local area networks on the channels from the first group and checks the scan results against profiles, if any, that are stored in the client device. The scanning may be passive or active or involve a combination of the two types. The order in which the channels in the first group are scanned may be according to the decreasing relative prevalence, in the population, of access point deployment on the channels in the first group, or may be any other order. Any suitable scanning algorithm may be used at 406. The profiles may be checked against the scan results in any suitable order. If there is a match, then the scanning scheme will end, and the client device will attempt to connect to the wireless local area network that matches the profile.

If all of the channels in the first group have been scanned without a profile match, the method proceeds to 408, where the client device checks the value of the flag. If the flag is zero, then at 410, one channel at a time, the WLAN controller of the client device scans for wireless local area networks on the channels from the second group and checks the scan results against profiles, if any, that are stored in the client device. The scanning may be passive or active or involve a combination of the two types. The order in which the channels in the second group are scanned may be according to the decreasing relative prevalence, in the population, of access point deployment on the channels in the second group, or may be any other order. Any suitable scanning algorithm may be used at 410. The profiles may be checked against the scan results in any suitable order. If there is a match, then the scanning scheme will end, and the client device will attempt to connect to the wireless local area network that matches the profile. If all of the channels in the second group have been scanned without a profile match, the flag is set to one at 412, and the method proceeds to 414.

If there were indeed scan results (checked at 414), the client device may present the scan results to the user at 416. If there were no scan results (which will occur, for example, when the client device is out of coverage), then the client device may wait for a period of time at 418, and when this period of time has elapsed, the method may resume from 406. The period of time during which the client device waits may be fixed, or may vary from one scan session to another. For example, successive scan sessions may be separated by increasing periods of time, possibly subject to an upper limit. The client device may enter a lower power state during all or part of the period of time between scan sessions.

If at 408 the flag is not zero, then the method proceeds to 420, where the client device checks the value of the flag. If the flag is one, then at 422, one channel at a time, the WLAN controller of the client device scans for wireless local area networks on the channels from the third group and checks the scan results against profiles, if any, that are stored in the client device. The scanning may be passive or active or involve a combination of the two types. The order in which the channels in the third group are scanned may be according to the decreasing relative prevalence, in the population, of access point deployment on the channels in the third group, or may be any other order. Any suitable scanning algorithm may be used at 422. The profiles may be checked against the scan results in any suitable order. If there is a match, then the scanning scheme will end, and the client device will attempt to connect to the wireless local area network that matches the profile. If all of the channels in the third group have been scanned without a profile match, the flag is set to two at 424, and the method proceeds to 414, where it is checked whether there are indeed scan results.

If at 420 the flag is not one, then the method proceeds to 426. At 426, one channel at a time, the WLAN controller of the client device scans for wireless local area networks on the channels from the fourth group and checks the scan results against profiles, if any, that are stored in the client device. The scanning may be passive or active or involve a combination of the two types. The order in which the channels in the fourth group are scanned may be according to the decreasing relative prevalence, in the population, of access point deployment on the channels in the fourth group, or may be any other order. Any suitable scanning algorithm may be used at 426. The profiles may be checked against the scan results in any suitable order. If there is a match, then the scanning scheme will end, and the client device will attempt to connect to the wireless local area network that matches the profile. If all of the channels in the fourth group have been scanned without a profile match, the flag is set to zero at 426, and the method proceeds to 414, where it is checked whether there are indeed scan results.

In general, the channels may be partitioned into a first group of one or more channels on which more access points in the population are deployed and N other groups of one or more channels on which fewer access points in the population are deployed, where N is a whole number greater than or equal to two. The channels in the first group may be scanned once per scan session, and the channels in one of the other groups may be scanned once per N scan sessions.

Figure 5:
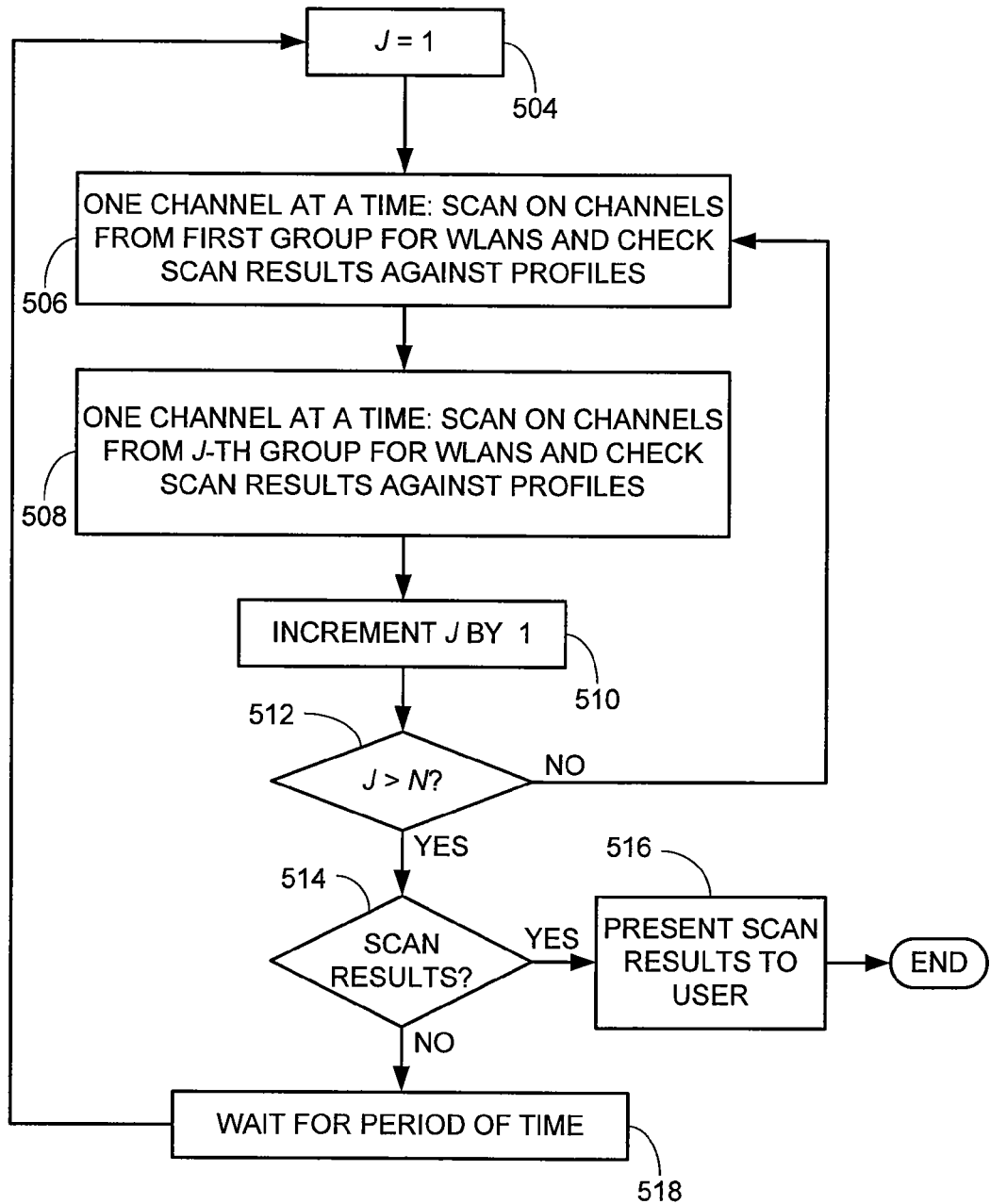

FIG. 5 is a flowchart of an exemplary scanning scheme able to be implemented in a WLAN client device. In this exemplary scanning scheme, the WLAN client device scans more than once per scan session one or more channels on which more access points in the population are deployed, while the WLAN client device scans once per scan session channels on which fewer access points in the population are deployed. If a wireless local area network is on a channel on which more access points in the population are deployed, it may be detected faster using this exemplary scanning scheme than using a scanning scheme in which channels are scanned in increasing numerical order. However, if there are no scan results, this exemplary scanning scheme may take more time than the scanning scheme in which channels are scanned in increasing numerical order.

At 504, an index J is set to one. At 506, one channel at a time, the WLAN controller of the wireless client device scans for wireless local area networks on the channels from the first group and checks the scan results against profiles, if any, that are stored in the client device. The scanning may be passive or active or involve a combination of the two types. The order in which the channels in the first group are scanned may be according to the decreasing relative prevalence, in the population, of access point deployment on channels in the first group, or may be any other order. Any suitable scanning algorithm may be used at 506. The profiles may be checked against the scan results in any suitable order. If there is a match, then the scanning scheme will end, and the client device will attempt to connect to the wireless local area network that matches the profile.

If all of the channels in the first group have been scanned without a profile match, then at 508, one channel at a time, the WLAN controller of the wireless client device scans for wireless local area networks on the channels from the J-th group and checks the scan results against profiles, if any, that are stored in the client device. The scanning may be passive or active or involve a combination of the two types. The order in which the channels in the J-th group are scanned may be according to the decreasing relative prevalence, in the population, of access point deployment on channels in the J-th group, or may be any other order. Any suitable scanning algorithm may be used at 508. The profiles may be checked against the scan results in any suitable order. If there is a match, then the scanning scheme will end, and the client device will attempt to connect to the wireless local area network that matches the profile.

If all of the channels in the J-th group have been scanned without a profile match, then at 510, the index J is incremented by one. If J is less than or equal to N, which is checked at 512, then the method proceeds from 506. Otherwise, if there were indeed scan results (checked at 514), the client device may present the scan results to the user at 516. If there were no scan results (which will occur, for example, when the client device is out of coverage), then the client device may wait for a period of time at 518, and when this period of time has elapsed, the method may resume from 504. The period of time during which the client device waits may be fixed, or may vary from one scan session to another. For example, successive scan sessions may be separated by increasing periods of time, possibly subject to an upper limit. The client device may enter a lower power state during all or part of the period of time between scan sessions.

In this exemplary scanning scheme, the channels in the first group are scanned N times per scan session and the channels in the other groups are scanned once per scan session.

Figure 6:
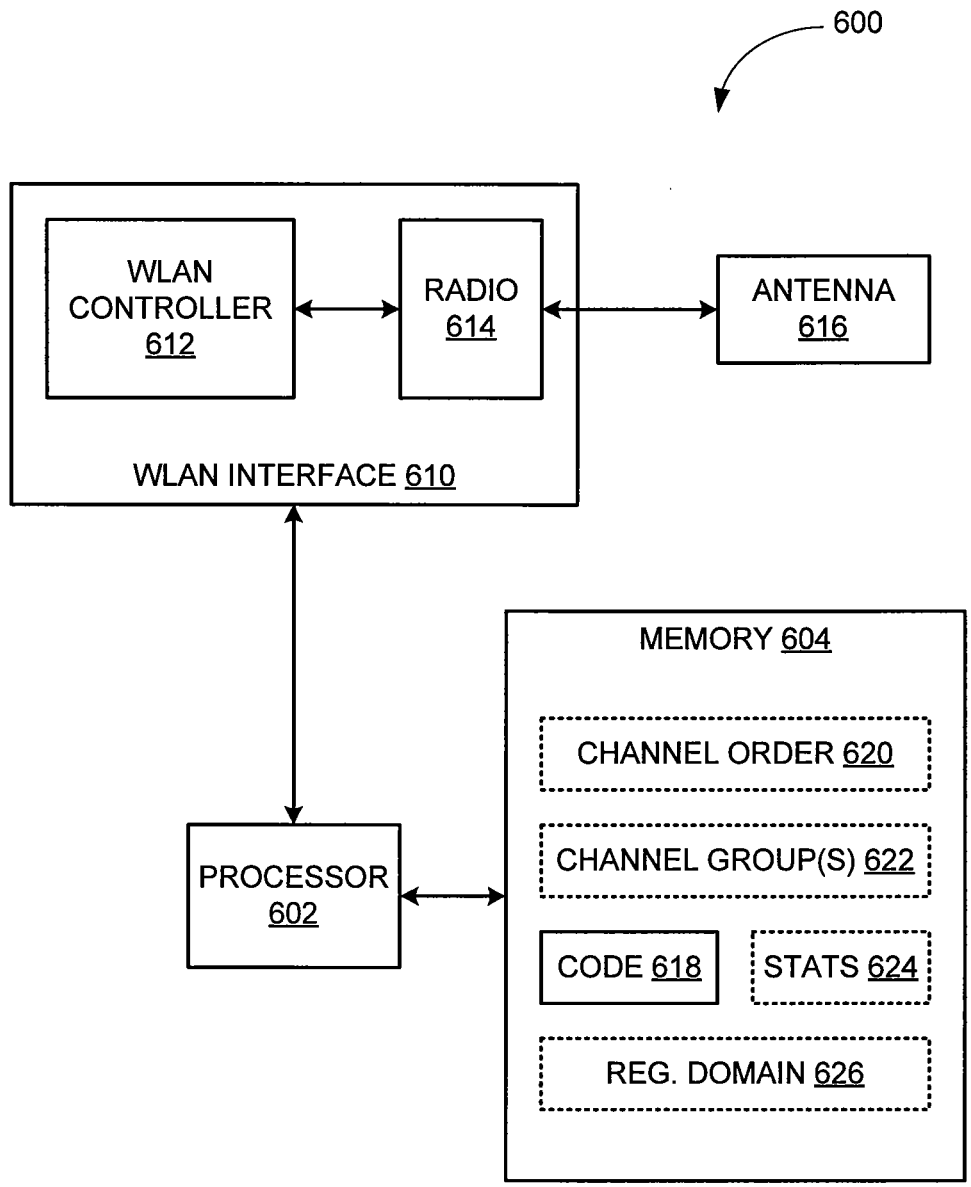
FIG. 6 is a block diagram of an exemplary client device.

FIG. 6 is a block diagram of an exemplary client device. A client device 600 comprises a processor 602, and a memory 604 coupled to processor 602.

Client device 600 comprises a WLAN interface 610, compatible with one or more WLAN standards, for example, one or more standards of the family of IEEE 802.11 wireless communication standards. WLAN interface 610 is coupled to processor 602 and includes at least a WLAN controller 612 and a radio 614. Client device 600 also comprises an antenna 616 coupled to radio 614. For example, client device 600 may be able to communicate with APs via WLAN interface 610 and antenna 616.

Memory 604 stores code 618 that, when executed by processor 602, may implement the methods described herein together with WLAN controller 612. Memory 604 may also store indications 620 of the order in which channels are to be scanned, or indications 622 of which channels belong to which groups, or both indications 620 and indications 622. For example, indications 622 may identify those channels on which more access points in a population are deployed and therefore belong to a first group and those channels on which fewer access points in the population are deployed and therefore belong to a second group, third group, fourth group, etc. If client device 600 maintains statistics of channels on which it has detected WLANs, the statistics may be stored in memory 604 in statistics 624. Memory 604 may also store an indication 626 of a last known regulatory domain in which client device 600 was located.

Client device 600 includes other components that, for clarity, are not shown in FIG. 6. A non-exhaustive list of examples for client device 600 includes a wireless-enabled laptop computer, a wireless-enabled tablet computer, a wireless-enabled cell phone, a wireless-enabled personal digital assistant (PDA), a wireless-enabled smart phone, a wireless-enabled video camera/monitor, a wireless-enabled gaming/multimedia console, a wireless-enabled sensor/reporting/storage device, a wireless Internet Protocol (IP) phone and any other suitable WLAN client device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a wireless local area network client device, the method comprising:
    scanning for wireless local area networks on one or more more-populated channels on which more access points in a population of access points are deployed; and
    scanning for wireless local area networks on two or more less-populated channels on which fewer access points in the population are deployed,
    wherein the scanning for wireless local area networks on the one or more more-populated channels occurs once per scan session;
    wherein the two or more less-populated channels are partitioned into N groups, where N is a whole number greater than or equal to two, and
    wherein scanning on the two or more less-populated channels comprises scanning once per N scan sessions on channels in one of the groups.

2. A method in a wireless local area network client device, the method comprising:
- scanning for wireless local area networks on one or more more-populated channels on which more access points in a population of access points are deployed; and
- scanning for wireless local area networks on two or more less-populated channels on which fewer access points in the population are deployed,
- wherein scanning on the two or more less-populated channels comprises scanning once per scan session on the two or more less-populated channels, wherein the two or more less-populated channels are partitioned into N groups, where N is a whole number greater than or equal to two, and wherein scanning on the one or more more-populated channels comprises scanning N times per scan session on the one or more more-populated channels.

3. The method of claim 1, wherein the population is a general population of access points worldwide.

4. The method of claim 1, wherein the population is a general population of access points in a single regulatory domain.

5. The method of claim 4, further comprising:
- determining that the client device is in a different regulatory domain than the single regulatory domain, and consequently scanning for wireless local area networks using a scanning scheme that takes into account the relative prevalence of access point deployment on channels in a general population of access points in the different regulatory domain.

6. The method of claim 1, wherein the population is a general population of access points in a single country.

7. The method of claim 6, further comprising:
- determining that the client device is in a different country than the single country, and consequently scanning for wireless local area networks using a scanning scheme that takes into account the relative prevalence of access point deployment on channels in a general population of access points in the different country.

8. The method of claim 1, wherein the population consists of access points that the client device has previously detected.

9. The method of claim 8, further comprising:
- modifying the scanning scheme based on statistics of channels on which the client device has previously detected wireless local area networks.

10. The method of claim 2, wherein the population is a general population of access points worldwide.

11. The method of claim 2, wherein the population is a general population of access points in a single regulatory domain.

12. The method of claim 11, further comprising:
- determining that the client device is in a different regulatory domain than the single regulatory domain, and consequently scanning for wireless local area networks using a scanning scheme that takes into account the relative prevalence of access point deployment on channels in a general population of access points in the different regulatory domain.

13. The method of claim 2, wherein the population is a general population of access points in a single country.

14. The method of claim 13, further comprising:
- determining that the client device is in a different country than the single country, and
- consequently scanning for wireless local area networks using a scanning scheme that takes into account the relative prevalence of access point deployment on channels in a general population of access points in the different country.

15. The method of claim 2, wherein the population consists of access points that the client device has previously detected.

16. The method of claim 15, further comprising:
- modifying the scanning scheme based on statistics of channels on which the client device has previously detected wireless local area networks.

* * * * *